US009827917B1

(12) United States Patent
Jones et al.

(10) Patent No.: US 9,827,917 B1
(45) Date of Patent: Nov. 28, 2017

(54) REMOVABLE CAR UMBRELLA

(71) Applicant: Maurice Jones, Newark, DE (US)

(72) Inventors: Maurice Jones, Newark, DE (US);
Randy Cardona, Menlo Park, CA (US); Jun Youn, Menlo Park, CA (US)

(73) Assignee: Maurice Jones, Newark, DE (US)

( * ) Notice: Subject to any disclaimer, the term of this patent is extended or adjusted under 35 U.S.C. 154(b) by 0 days.

(21) Appl. No.: 15/134,612

(22) Filed: Apr. 21, 2016

Related U.S. Application Data

(60) Provisional application No. 62/150,316, filed on Apr. 21, 2015.

(51) Int. Cl.
*B60J 7/00* (2006.01)
*B60R 11/00* (2006.01)

(52) U.S. Cl.
CPC ......... *B60R 11/00* (2013.01); *B60R 2011/004* (2013.01)

(58) Field of Classification Search
CPC ............ A45B 11/00; A45B 2023/0012; A45B 2025/003; A45B 2200/1054; A45B 23/00; A47F 9/00; Y10T 29/49826; B62B 2202/52; B60R 11/00; B60R 2011/004
USPC .................................. 296/99.1, 37.1; 135/16
See application file for complete search history.

(56) References Cited

U.S. PATENT DOCUMENTS

| | | | | |
|---|---|---|---|---|
| 1,460,821 A | * | 7/1923 | Morris | A45B 11/02 135/16 |
| 2,164,242 A | * | 6/1939 | Henry | A45B 25/24 135/34.2 |
| 2,426,113 A | * | 8/1947 | Northcutt | B60R 7/12 211/63 |
| 3,081,126 A | * | 3/1963 | Theberge | B60R 7/12 224/544 |
| 3,866,934 A | * | 2/1975 | Braun | A63B 55/60 135/16 |
| 4,008,874 A | * | 2/1977 | Conway, Jr. | A45B 11/00 248/534 |
| 4,188,965 A | * | 2/1980 | Morman | A45B 11/02 135/15.1 |

(Continued)

FOREIGN PATENT DOCUMENTS

| | | |
|---|---|---|
| EP | 0036675 | 9/1981 |
| WO | WO2013/148952 | 10/2013 |
| WO | WO2013148952 | 10/2013 |

OTHER PUBLICATIONS http://www.psfk.com/2013/06/rolls-royce-phantom-ghost-umbrella.html.
http://www.core77.com/posts/36546/Making-a-Drip-Free-Car-Friendly-Umbrella.
http://core77.com/posts/25012/Rainy-Day-Design-Flaw-Why-Arent-Umbrellas-Better-Integrated-with-Cars.

*Primary Examiner* — Kiran B Patel
(74) *Attorney, Agent, or Firm* — Joseph E. Maenner; Maenner & Associates, LLC

(57) ABSTRACT

In described embodiments, an automobile-mounted umbrella assembly contains a storage container movable between a stowed position and a deployment position and a motor operably connected to the storage container to move the storage container between the stowed position and the deployment position. An umbrella is removably stored in the storage container in a closed position. When the storage container is in the deployment position, the umbrella extends outwardly from the storage container and moves from the closed position to an open position. The umbrella is removable from the storage container for use away from the automobile.

15 Claims, 6 Drawing Sheets

(56) References Cited

U.S. PATENT DOCUMENTS

| | | | | |
|---|---|---|---|---|
| 4,445,720 A * | 5/1984 | Leaf | | B60R 7/06 |
| | | | | 135/16 |
| 4,543,971 A | 10/1985 | Sirota | | |
| 4,562,849 A * | 1/1986 | Sirota | | A45B 11/00 |
| | | | | 135/16 |
| 4,711,422 A * | 12/1987 | Ibanez | | A45B 11/00 |
| | | | | 248/230.5 |
| 4,807,920 A | 2/1989 | Fujiki et al. | | |
| 5,046,446 A * | 9/1991 | Sumrall | | A45B 25/00 |
| | | | | 116/200 |
| 5,150,728 A * | 9/1992 | Stark | | B60R 11/00 |
| | | | | 135/16 |
| 5,188,331 A * | 2/1993 | Baines | | A45B 11/00 |
| | | | | 135/16 |
| 5,287,871 A * | 2/1994 | Trice | | B60J 11/00 |
| | | | | 135/16 |
| 5,318,055 A * | 6/1994 | Olaniyan | | A45B 11/02 |
| | | | | 135/16 |
| 5,425,388 A * | 6/1995 | Chen | | A45B 25/24 |
| | | | | 135/34.2 |
| 5,449,012 A | 9/1995 | Friedman | | |
| 5,452,877 A * | 9/1995 | Riffle | | E04H 12/2246 |
| | | | | 135/16 |
| 5,476,302 A * | 12/1995 | Ronci | | B60J 11/025 |
| | | | | 296/152 |
| 5,529,368 A | 6/1996 | Cui et al. | | |
| 5,709,328 A * | 1/1998 | Ackeret | | B60R 7/12 |
| | | | | 211/63 |
| 5,713,627 A * | 2/1998 | De Filippo | | B60R 7/12 |
| | | | | 135/16 |
| 5,725,004 A * | 3/1998 | Moulder | | B60J 5/0494 |
| | | | | 135/15.1 |
| 5,727,583 A * | 3/1998 | Kennedy | | E04H 12/2284 |
| | | | | 135/15.1 |
| 5,762,308 A * | 6/1998 | Bryan | | A45B 11/00 |
| | | | | 135/16 |
| 5,850,843 A * | 12/1998 | Mahood | | A45B 23/00 |
| | | | | 135/16 |
| 6,805,144 B2 | 10/2004 | Usui et al. | | |
| 6,810,894 B2 | 11/2004 | Chen | | |
| 7,406,975 B1 * | 8/2008 | Carrier, Jr. | | E04H 12/2261 |
| | | | | 135/16 |
| 7,604,281 B1 * | 10/2009 | Raynor | | B60J 5/0494 |
| | | | | 135/88.07 |
| 7,967,274 B1 * | 6/2011 | Stallings, Jr. | | A45B 11/00 |
| | | | | 248/206.3 |
| 8,276,607 B2 | 10/2012 | Kim | | |
| 8,366,172 B1 | 2/2013 | Morazan | | |
| 8,726,921 B2 * | 5/2014 | Wilkins | | A45B 3/02 |
| | | | | 135/20.1 |
| 2002/0139403 A1 * | 10/2002 | Shi | | A45B 11/00 |
| | | | | 135/16 |
| 2004/0206381 A1 * | 10/2004 | Siegel | | A45B 11/00 |
| | | | | 135/16 |
| 2006/0272688 A1 * | 12/2006 | McWhorter | | A45B 11/00 |
| | | | | 135/16 |
| 2010/0071737 A1 * | 3/2010 | Gourdine | | A45B 11/00 |
| | | | | 135/16 |
| 2010/0269873 A1 * | 10/2010 | Lee | | A45B 11/00 |
| | | | | 135/88.05 |
| 2013/0256355 A1 * | 10/2013 | Gatto-Weising | | B60R 11/00 |
| | | | | 224/482 |
| 2015/0230569 A1 * | 8/2015 | Williams | | A45B 25/16 |
| | | | | 135/90 |
| 2016/0015137 A1 * | 1/2016 | Sasaki | | A45B 25/00 |
| | | | | 135/20.1 |

* cited by examiner

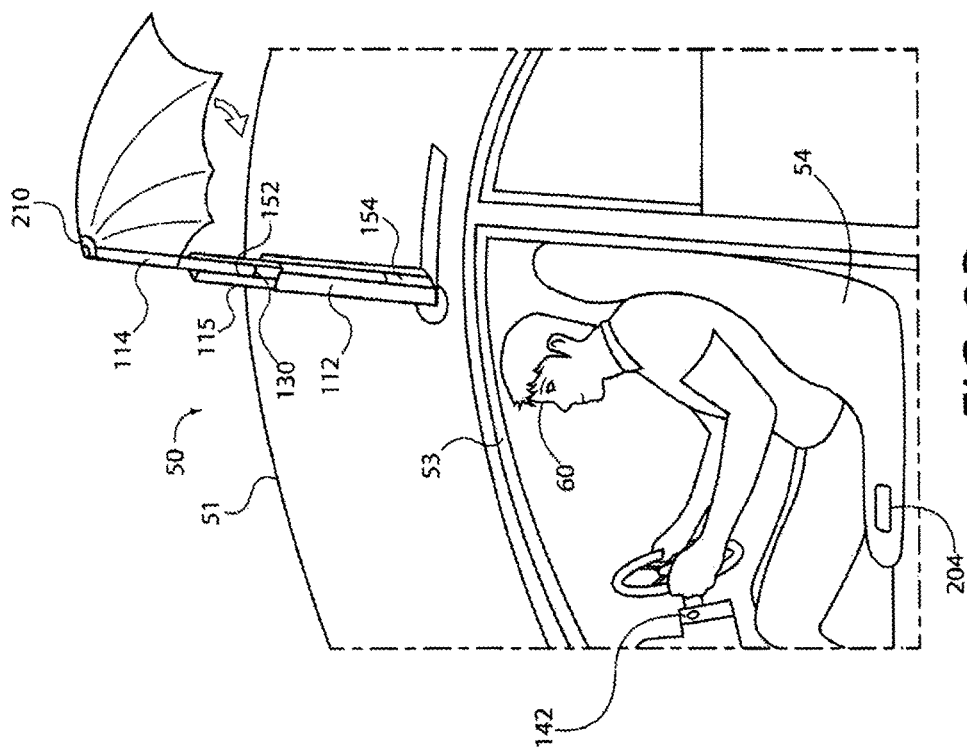
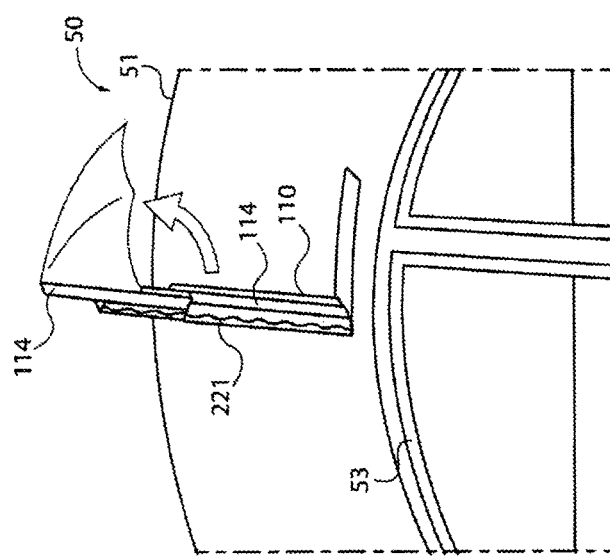
FIG. 3B
FIG. 3A

REMOVABLE CAR UMBRELLA

CROSS-REFERENCE TO RELATED APPLICATION

The present application claims priority from U.S. Provisional Patent application 62/150,316, filed on Apr. 21, 2015, which is incorporated herein by reference in its entirety.

BACKGROUND OF THE INVENTION

Field of the Invention

The present invention relates to umbrellas, and, in particular, to umbrellas that can be stored in an automobile and activate upon operation by the vehicle occupant.

Description of the Related Art

Some luxury automobiles provide umbrellas stored in the driver-side door to provide the driver with quick access to an umbrella so that the driver can exit the automobile without getting wet. A drawback to these umbrellas is that the door must be opened prior to opening the umbrella, allowing the driver to get wet in the time period between opening the door and opening the umbrella. It would be beneficial to provide an car-mounted umbrella that opens prior to the driver opening the door so that, as the driver opens the door and exits the vehicle, the driver is covered by the umbrella and does not get wet.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an automobile-mounted umbrella assembly, comprising a storage container movable between a stowed position and a deployment position and a motor operably connected to the storage container to move the storage container between the stowed position, and the deployment position. An umbrella is removably stored in the storage container in a closed position. When the storage container is in the deployment position, the umbrella extends outwardly from the storage container and moves from the closed position to an open position.

In an alternative embodiment, the present invention is an automobile-mounted umbrella assembly, the automobile having a roof. The assembly comprises a telescoping storage container mounted on the roof of the automobile and operable between a stowed position and a deployment position, and an umbrella shaft removably connected to the storage container. The umbrella shaft is operable between a compressed position when the storage container is in the stowed position and an extended position when the storage container is in the deployment position. An umbrella cover is operably attached to the umbrella shaft and operable between a compressed position when the storage container is in the stowed position and a canopy position when the storage container is in the deployment position. A motor is operatively coupled to the storage container, such that operation of the motor operates the storage container between the stowed position, and the deployment position.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3A is a perspective view of the umbrella container of FIG. 1 in an open position, with the umbrella in a partially open position;

FIG. 3B is a perspective view of the umbrella container of FIG. 1 in an open position, with the umbrella in a fully open position;

DETAILED DESCRIPTION OF THE INVENTION

Figure 1A:
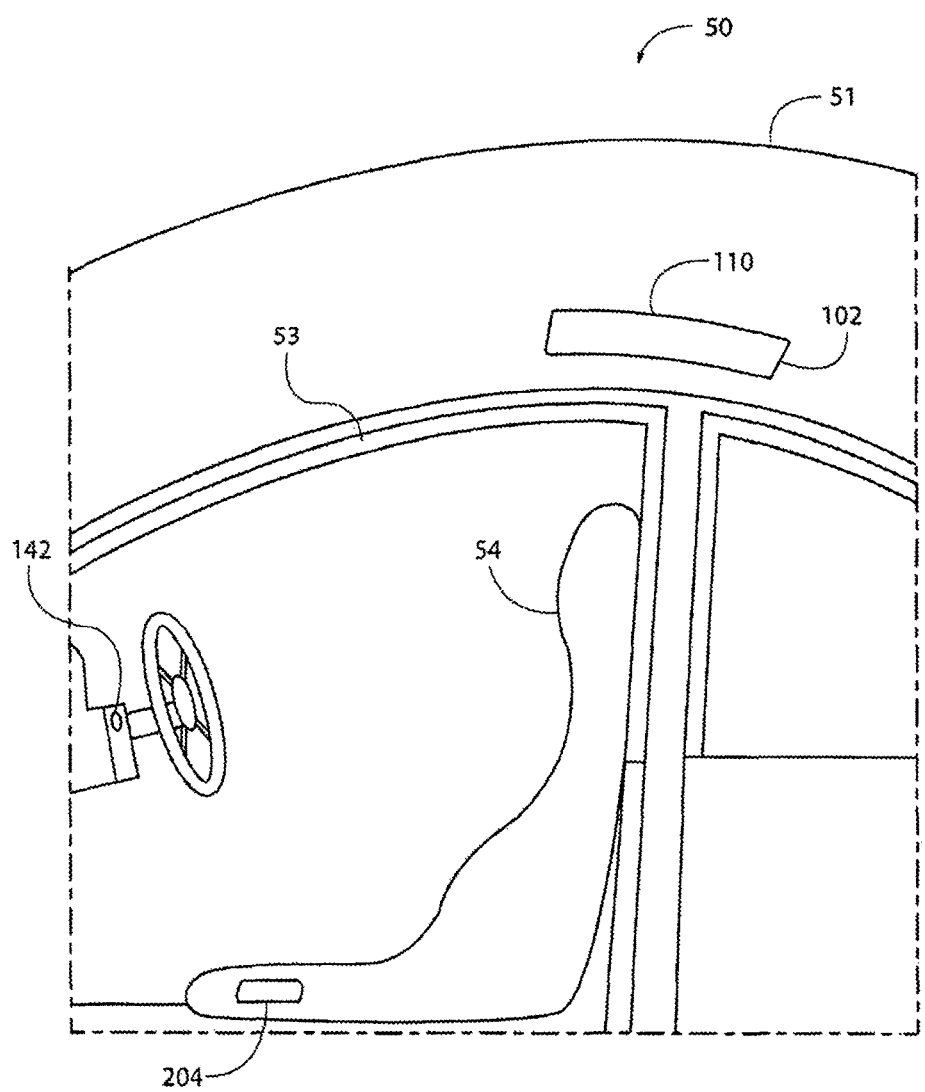
FIG. 1A is a perspective view of an umbrella container according to an exemplary embodiment of the present invention installed in a stowed position on an automobile roof.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to the Figures, an automobile-mounted umbrella assembly is disclosed. The inventive umbrella assembly allows an automobile occupant to open an umbrella outside of the automobile while the occupant is still inside the automobile to enable the occupant to exit the automobile without getting wet. Additionally, the umbrella is removable from the umbrella assembly to enable the occupant to depart the automobile while carrying the umbrella.

Referring specifically to FIGS. 1A-3B, an umbrella assembly 100 according to a first exemplary embodiment of the present invention is shown. Umbrella assembly 100 includes a storage container 102 into which an umbrella 150 is removably inserted.

A control arm 110 is movable between a stowed position, shown in FIG. 1A, and a deployment position, shown in FIG. 3B. Control arm 110 is a generally elongate hollow container. Control arm 110 is mounted on the roof 51 of an automobile 50 onto which umbrella assembly 100 is installed. Control arm 110 is mounted proximate to a driver side door 53 on automobile 50, such that, when umbrella assembly 100 is activated, an umbrella 150 (shown in FIGS. 3A and 3B) extends outwardly from control arm 110 and opens to cover the driver side door and the driver so that the driver does not get wet upon exiting automobile 50.

Optionally, a reservoir is provided on roof 51 under control arm 110 to receive rain water and to divert the rain water away from driver side door 53 so that the rain water does not spill onto the driver as the driver is exiting automobile 50.

Control arm 110 includes a plurality of telescoping sections 112, 114 that extend upon the opening of control arm 110. Base section 112 is located on the exterior of control arm 110 and is flush with roof 51 when umbrella assembly 100 is closed. A bottom end 112*a* of base section 112 is pivotally mounted to roof 51. A bottom end 114*a* of top section 114 is telescopically coupled to base section 112, and slides along the length of base section 112 to extend middle section 114 from base section 112. A motor 115 (shown in FIG. 3B) at the top of section 112 slides a rack attached to section 114 so that section 114 extends outwardly from section 112 as control arm 110 pivots outwardly from roof 51.

Each of sections 112, 114 is generally U-shaped such that umbrella 150 can be inserted within sections 112, 114 and the user can reach into control arm 110 when control arm 110 is open to grasp umbrella 150 and remove umbrella 150 from control arm 110.

Figure 1B:
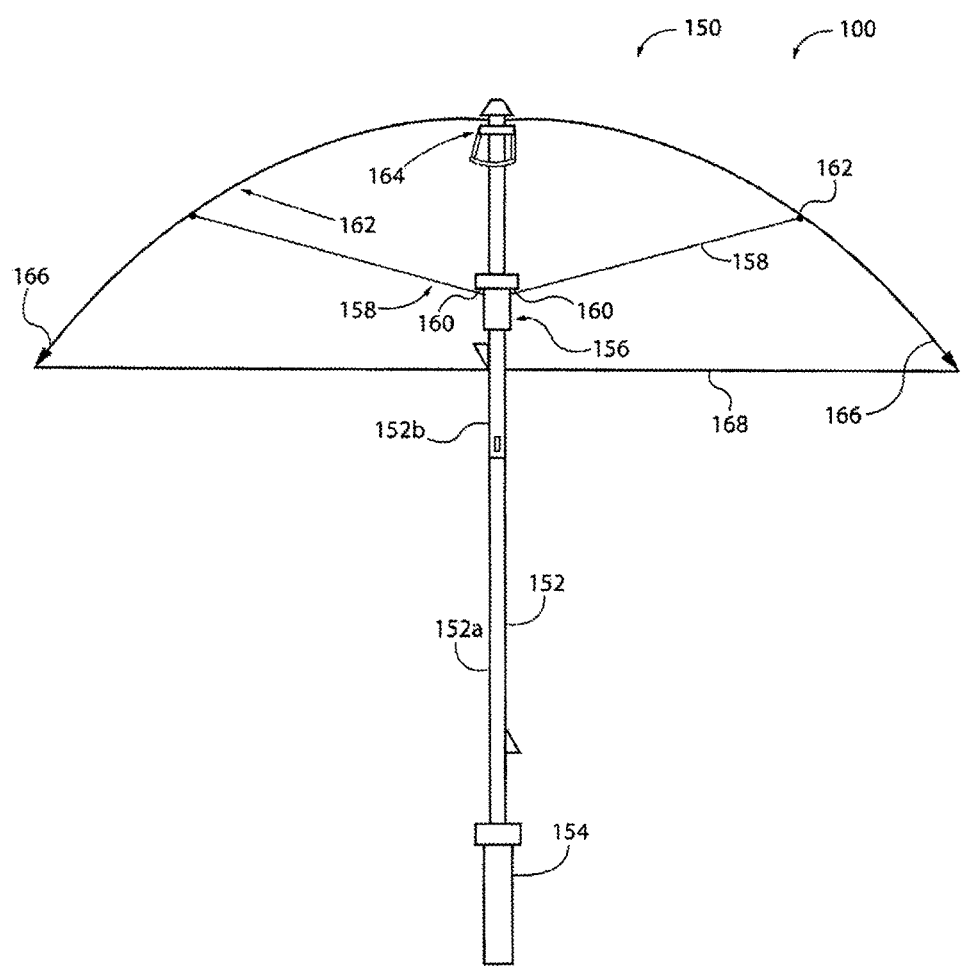
FIG. 1B is a side elevational view, in section, of an exemplary umbrella for use with the umbrella assembly according to the present invention.
Figure 2:
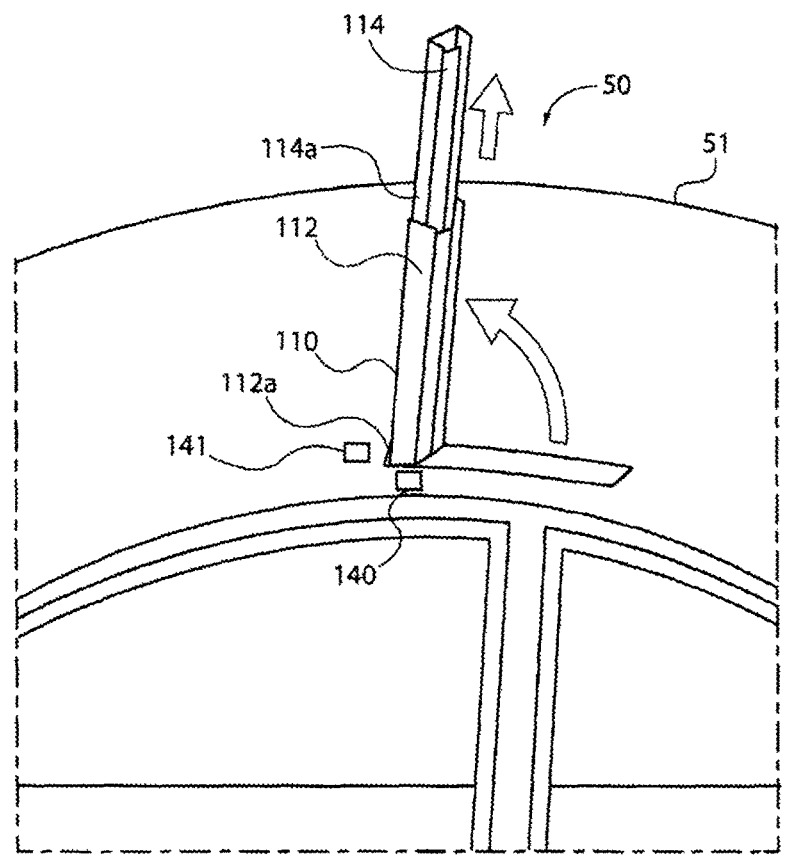
FIG. 2 is a perspective view of the umbrella container of FIG. 1 in an open position

Referring to FIG. 1B, an exemplary umbrella 150 includes an elongate shaft 152 having a handle 154 at one end of shaft 152. A runner 156 is slidably mounted on shaft 152. A plurality of stretchers 158 are pivotally mounted at a first end 160 to runner 156 and at a second end to ribs 162. Each rib 162 has a first end 164 coupled to the top of shaft 152, distal from handle 154. A second end 166 of each rib 162 is connected to an edge of a fabric umbrella cover 168. Cover 168 stretches over ribs 162 and opens to form a canopy when umbrella 150 is opened. In an exemplary embodiment, the outer edge of cover 168 traces a semi-circle having an arc of about 180 degrees. Those skilled in the art, however, will recognize that cover 168 can trace an arc of greater than or less than about 180 degrees.

Shaft 152 is segmented into a plurality of telescoping segments 152*a*, 152*b* such that segment 152*b* extends outwardly from segment 152*a* when control arm 110 is opened and control arm section 114 extends outwardly from control arm section 112. Similarly, segment 152*b* retracts into segment 152*a* when control arm 110 is closed.

A first electric motor 140 is used to move control arm 110 between the stowed position and the deployment position. Electric motor 140 also rotates control arm 110 about its longitudinal axis about 90 degrees so that, when umbrella 150 is open, cover 168 of umbrella 150 extends around the space above the driver's door 53. A second electric motor 141 rotates control arm 110 about 90 degrees (clockwise looking down from above) so that umbrella 150 opens over door 53. A relay 143 (shown in FIG. 4A) closes when first motor 140 deploys control arm 110, activating second motor 141.

Umbrella 150 can include a biasing mechanism, such as, for example, a spring, commonly used in the umbrella art, to open umbrella 150 from the closed position to the open position so that umbrella 150 can move to the open position without human intervention. Alternatively, umbrella 150 uses a motor 210 that opens/closes cover 168. Motor 210 is powered by automobile battery 200 via contacts (not shown) in umbrella handle 152 that contact an electrical supply in control arm 110.

Additionally, control arm 110 further includes a release mechanism 130 that is operable to releasably secure umbrella 150 to control arm 110. As shown in FIG. 3B, release mechanism 130 can be a clip that uses friction to retain umbrella 150 to control arm 110. Release mechanism 130 engages shaft 152 of umbrella 150. Referring to FIG. 4B, a relay 211 closes when umbrella 150 is inserted into release mechanism 130 and opens when umbrella 150 is removed from release mechanism 130.

Figure 4A:
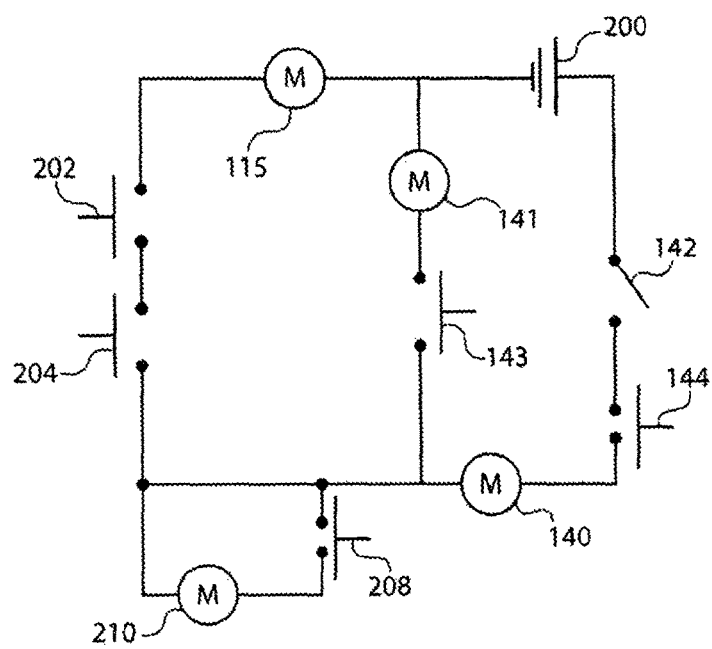
FIG. 4A is an exemplary electrical schematic for moving the umbrella storage container from a closed to an open position.
Figure 4B:
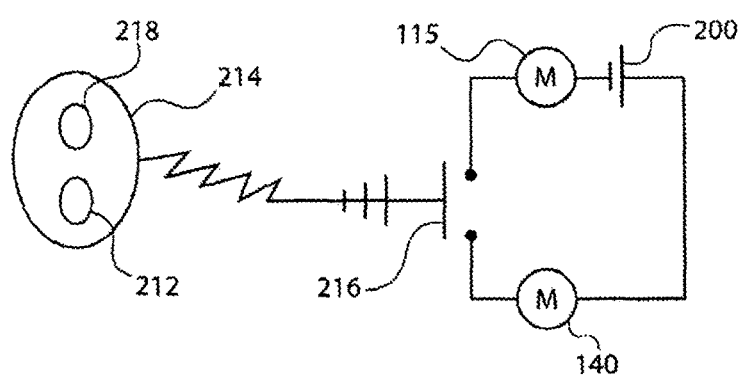
FIG. 4B is an exemplary electrical schematic for closing the umbrella storage container after the umbrella has been removed from the umbrella storage container.

An exemplary electrical schematic for the operation of umbrella assembly 100 is shown FIGS. 4A-4E. Referring to FIG. 4A, as well as FIGS. 2-3B, a motor 140 is operably connected to control arm 110 to move control arm 110 between the stowed position (FIG. 1A), and the deployment position (FIG. 1B). Motor 140 is located in roof 51 and is electrically powered by the battery 200 that powers electrical system (not shown) of the automobile 50 and is activated via a user interface button 142 mounted on door 52, the dashboard (not shown) of automobile 50, or other suitable location inside automobile 50. Interface button 142 is electronically coupled to control arm 110 to move control arm 110 between the stowed position and the deployment position. Additionally, a safety relay 144 is electronically coupled to motor 140 to prevent operation of motor 140 unless a predetermined condition is satisfied. For example, safety relay 144 can be operably connected to the gear shift and/or parking brake of automobile 50 such that safety relay 144 prevents operation of motor 140, when automobile 50 is not in "PARK". Additional sensor relays, such as rain sensor relay 202 and seat sensor relay 204 must also be engaged to confirm that it is in fact raining outside of automobile 50 and that a driver 60 is seated in the driver seat 54 of automobile 50.

When motor 140 moves control arm 110 to its fully deployed position, relay 143 closes, allowing motor 141 to rotate control arm 110 so that, when umbrella 150 opens, umbrella 150 covers the driver as the driver exits automobile 50. Additionally, as motor 140 moves control arm 110 to its fully deployed position, motor 115 operates to extend control arm section 114 from control arm section 112. After control arm 110 is moved to the deployment position, a container deployment relay 208 is closed, activating umbrella motor 210 to deploy umbrella 150.

After the driver exits automobile 50, the driver can remove umbrella 150 from control arm 110 and carry umbrella 150 to wherever the driver is going. Removing umbrella 150 from control arm 110 allows the driver to manually retract section 114 back into section 112 and close control arm 110. An exemplary electrical schematic showing an electrical diagram for closing control arm 110 is shown in FIG. 4B. Car battery 200 provides electrical power to container motor 140. When the driver presses a button 212 on a key fob 214 to transmit a radio frequency signal to close a motor relay 216, the electrical circuit of FIG. 4B closes and activates container motor 140 to close control arm 110.

Figure 4C:
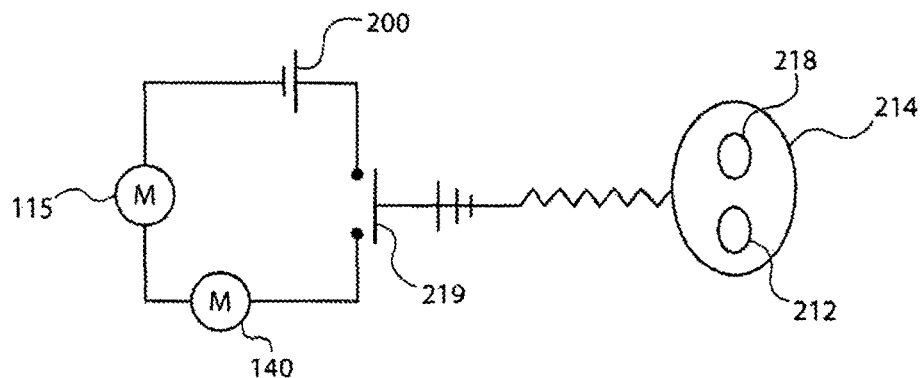
FIG. 4C is an exemplary electrical schematic for opening the umbrella storage container from outside of the automobile.

Referring to the schematic of FIG. 4C, when the driver returns to automobile 50 and desires to put umbrella 150 back into control arm 110, the driver presses button 218 on key fob 214, which transmits a radio frequency signal to close a switch 219 to operate motors 115, 140 to deploy control arm 110 from its stowed to its deployed position.

Figure 4D:
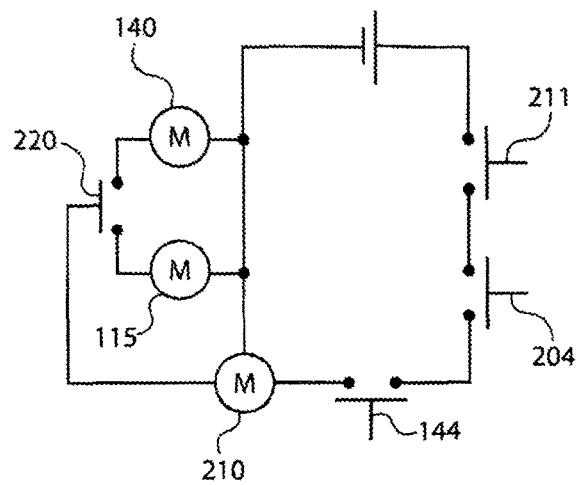
FIG. 4D is an exemplary electrical schematic for closing the umbrella storage container after the umbrella has been inserted into the umbrella storage container.

Referring to the schematic of FIG. 4D, when sensor relay 211 indicates that umbrella 150 is reinstalled in control arm 110, seat relay 204 closes to indicate that the driver is seated (shown in black in FIG. 3A and shown in white as "open" in FIG. 1A when the driver is not seated), and sensor relay 144 indicates that automobile door 53 is closed, umbrella motor 210 is activated to close umbrella 150. After umbrella 150 has closed, as indicated by a sensor 220, motor 140 and motor 115 are activated to move control arm 110 from the deployed position to the stowed position.

Figure 4E:
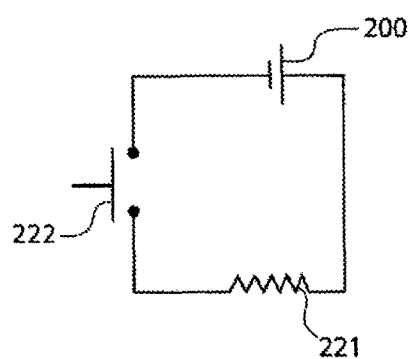
FIG. 4E is an exemplary electrical schematic for deicing the umbrella storage container.

Referring to the schematic of FIG. 4E, in the event that automobile 50 is used in cold weather that could possibly generate ice forming over control arm 110, a heating coil 221 can be provided that automatically heats control arm 110 when the exterior temperature falls below a certain temperature, such as, for example, about 32 degrees Fahrenheit. At that temperature, a relay 222 closes, thereby providing electrical power from battery 200 to heating coil 221 to melt and/or prevent any ice from forming on control arm 110.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. An automobile-mounted umbrella assembly, comprising:
    a storage container movable between a stowed position and a deployment position;
    a motor operably connected to the storage container to move the storage container between the stowed position, and the deployment position;
    an umbrella removably stored in the storage container in a closed position, wherein, when the storage container is in the deployment position, the umbrella extends outwardly from the storage container and moves from the closed position to an open position.

2. The automobile-mounted umbrella assembly according to claim 1, further comprising an automobile, wherein the automobile comprises a roof and wherein the storage container is mounted in the roof.

3. The automobile-mounted umbrella assembly according to claim 1, further comprising an operating button electronically coupled to the storage container to move the storage container between the stowed position and the deployment position.

4. The automobile-mounted umbrella assembly according to claim 3, further comprising a safety relay electronically coupled to the motor to prevent operation of the motor unless a predetermined condition is satisfied.

5. The automobile-mounted umbrella assembly according to claim 4, wherein the predetermined condition comprises the automobile being stopped.

6. The automobile-mounted umbrella assembly according to claim 1, wherein the storage container comprises a release mechanism operable to releasably secure the umbrella to the storage container.

7. The automobile-mounted umbrella assembly according to claim 1, wherein the umbrella moves from the closed position to the open position in the absence of human intervention.

8. The automobile-mounted umbrella assembly according to claim 1, wherein the umbrella comprises a shaft extending along an axis and a plurality of stretchers extending generally parallel to the axis in the closed position, and wherein the plurality of stretchers pivot away from the axis to move the umbrella to the open position.

9. The automobile-mounted umbrella assembly according to claim 8, wherein the plurality of stretchers further pivot along an arc generally oblique to the axis to move the umbrella to the open position.

10. The automobile-mounted umbrella assembly according to claim 1, further comprising a heating coil extending along the storage container.

11. The automobile-mounted umbrella assembly according to claim 1, wherein, when the storage container moves between the stowed position, and the deployment position, the storage container telescopes between a compressed condition and an extended condition.

12. The automobile-mounted umbrella assembly according to claim 1, further comprising a first motor operatively coupled to the storage container, such that operation of the motor operates the storage container between the stowed position and the deployment position and a remote device adapted to transmit a radio frequency signal to the first motor to operate the first motor.

13. The automobile-mounted umbrella assembly according to claim 12, further comprising a second motor operatively coupled to the umbrella cover such that, after operation of the first motor to operate the storage container to the deployment position, the second motor operates to open the umbrella cover.

14. The automobile-mounted umbrella assembly according to claim 12, further comprising a relay operatively attached to the first motor such that, when the relay is closed, the first motor is operable and when the relay is open, the first motor is inoperable.

15. The automobile-mounted umbrella assembly according to claim 14, wherein the relay comprises a seat relay that is closed when a driver is seated in a seat and is open when the driver is not seated in the seat.

* * * * *